United States Patent
Lee

(10) Patent No.: US 11,543,489 B2
(45) Date of Patent: Jan. 3, 2023

(54) MULTI-TARGET RADAR EMULATOR SYSTEM

(71) Applicant: Keysight Technologies, Inc., Santa Rosa, CA (US)

(72) Inventor: Gregory S. Lee, Mountain View, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 313 days.

(21) Appl. No.: 16/867,804

(22) Filed: May 6, 2020

(65) Prior Publication Data

US 2021/0055384 A1 Feb. 25, 2021

Related U.S. Application Data

(60) Provisional application No. 62/889,267, filed on Aug. 20, 2019.

(51) Int. Cl.
*G01S 7/40* (2006.01)
*G01S 13/931* (2020.01)

(52) U.S. Cl.
CPC .......... *G01S 7/4056* (2013.01); *G01S 13/931* (2013.01); *G01S 7/4086* (2021.05)

(58) Field of Classification Search
CPC ..... G01S 7/4056; G01S 13/931; G01S 7/4086
See application file for complete search history.

(56) References Cited

U.S. PATENT DOCUMENTS

| | | |
|---|---|---|
| 4,613,863 A | 9/1986 | Mitchell |
| 4,660,041 A | 4/1987 | Maples et al. |
| 4,686,534 A | 8/1987 | Eddy |
| 4,737,792 A | 4/1988 | Grone |
| 5,117,230 A | 5/1992 | Wedel, Jr. |
| 5,177,488 A | 1/1993 | Wang et al. |
| 5,247,843 A * | 9/1993 | Bryan ............. F41G 7/002 342/170 |
| 5,431,568 A | 7/1995 | Fey et al. |
| 5,457,463 A | 10/1995 | Vencel et al. |
| 5,528,522 A | 6/1996 | Delguerico |
| 5,892,479 A | 4/1999 | Mills et al. |

(Continued)

FOREIGN PATENT DOCUMENTS

| CN | 102928824 B | 2/2013 |
|---|---|---|
| CN | 109459733 A | 3/2019 |

(Continued)

OTHER PUBLICATIONS

O Meena et al., "Design of Multilevel Radar Target Simulator," 2007 IEEE Radar Conference, pp. 203-208.

(Continued)

*Primary Examiner* — Peter M Bythrow
*Assistant Examiner* — Nazra Nur Waheed

(57) ABSTRACT

A system for testing vehicular radar is described. The system include a diffractive optical element (DOE) configured to diffract electromagnetic waves incident on a first side from a radar device under test (DUT). The system also includes a re-illumination element adapted to receive the electromagnetic waves diffracted from the DOE from a second side. The re-illumination element being adapted to transmit apparent angle of arrival (AoA) electromagnetic waves back to the DOE.

20 Claims, 7 Drawing Sheets

(56) References Cited

U.S. PATENT DOCUMENTS

| | | | |
|---|---|---|---|
| 6,067,041 A | 5/2000 | Kaiser et al. | |
| 6,075,480 A | 6/2000 | Deliberis, Jr. | |
| 6,114,985 A | 9/2000 | Russell et al. | |
| 6,384,771 B1 | 5/2002 | Montague et al. | |
| 6,496,139 B1 | 12/2002 | Flacke et al. | |
| 6,803,877 B2 | 10/2004 | Ludewig et al. | |
| 7,145,504 B1 | 12/2006 | Newberg et al. | |
| 8,334,803 B1 | 12/2012 | Urkowitz | |
| 9,151,828 B2 | 10/2015 | Shipley | |
| 9,581,683 B2 | 2/2017 | Choi | |
| 10,509,107 B2 | 12/2019 | Heuel et al. | |
| 10,527,715 B2 | 1/2020 | Ahmed et al. | |
| 2006/0267832 A1 | 11/2006 | Newberg et al. | |
| 2008/0018525 A1 | 1/2008 | Svy et al. | |
| 2015/0219752 A1 | 8/2015 | Lewis et al. | |
| 2015/0369905 A1* | 12/2015 | Shipley | H01Q 21/225 |
| | | | 342/171 |
| 2017/0010347 A1 | 1/2017 | Schutte et al. | |
| 2017/0115378 A1 | 4/2017 | Haghighi et al. | |
| 2017/0270376 A1* | 9/2017 | Aina | G01S 7/4816 |
| 2017/0363719 A1 | 12/2017 | Ahmed et al. | |
| 2019/0041496 A1 | 2/2019 | Salvesen et al. | |
| 2019/0391234 A1 | 12/2019 | Gruber et al. | |
| 2020/0019160 A1 | 1/2020 | McArthur et al. | |
| 2021/0055384 A1 | 2/2021 | Lee | |

FOREIGN PATENT DOCUMENTS

| | | |
|---|---|---|
| CN | 112630733 A | 4/2021 |
| CN | 114258498 A | 3/2022 |
| DE | 102020212593 A1 | 4/2021 |
| JP | H07174840 A | 7/1995 |
| JP | 2022018108 A | 1/2022 |
| KR | 10-2017-0069246 A | 6/2017 |
| KR | 10-2017-0103263 A | 9/2017 |
| WO | 2019/068126 A1 | 4/2019 |
| WO | 2021034357 A1 | 2/2021 |

OTHER PUBLICATIONS

Notice of Allowance dated May 31, 2022, U.S. Appl. No. 16/995,913, 20 pgs.

Werner Scheiblhofer et al., "Low-cost Target Simulator for End-of-Line Tests of 24-GHz Radar Sensors", Warsaw Univ. of Technology, 2018, pp. 531-534.

Werner Scheiblhofer et al., "A Low-Cost Multi-Target Simulator for FMCW Radar System Calibration and Testing", Proceedings of the 14th European Radar Conference, 2017, pp. 343-346.

International Search Report and Written Opinion for PCT Application No. PCT/US2020/031588 dated Aug. 21, 2020, 9 pgs.

Fraunhofer-Gesellschaft. Virtual tests for autonomous driving systems. Phys.org [online], Apr. 1, 2019, https://phys.org/news/2019-04-virtual-autonomous.html, pp. 1-3.

Michael Ernst Gadringer et al., "Radar target stimulation for automotive applications", IET Radar, Sonar, and Navigation, vol. 12, issue 10, 2018, pp. 1-8.

David B. Rutledge et al., "Performance of a 100-element HBT grid amplifier", IEEE Transactions on Microwave Theory and Techniques, vol. 41, No. 10, Oct. 1993, pp. 1762-1771.

Notice of Allowance dated Sep. 14, 2022, for U.S. Appl. No. 16/995,913.

* cited by examiner

MULTI-TARGET RADAR EMULATOR SYSTEM

CROSS REFERENCE TO RELATED APPLICATIONS

This application claims priority under 35 U.S.C. § 119(e) from commonly owned U.S. Patent Application Publication No 20210055384 to Gregory S. Lee, et al. entitled "Multi-Target Radar Emulator System" filed on Aug. 20, 2019. The entire disclosure of U.S. Patent Application Publication No 20210055384 is hereby incorporated by reference in its entirety.

BACKGROUND

Millimeter waves result from oscillations at frequencies in the frequency spectrum between 30 gigahertz (GHz) and 300 gigahertz. Millimeter wave (mmWave) automotive radar is a key technology for existing advanced driver-assistance systems (ADAS) and for planned autonomous driving systems. For example, millimeter wave automotive radar is used in advanced driver-assistance systems to warn of forward collisions and backward collisions. Additionally, millimeter wave automotive radar may be used in planned autonomous driving systems to implement adaptive cruise control and autonomous parking, and ultimately for autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that millimeter wave automotive radar can now be deployed in large volumes. As a result, millimeter wave automotive radars are now widely used for long range, middle range and short range environment sensing in advanced driver-assistance systems. Additionally, millimeter wave automotive radars are likely to be widely used in autonomous driving systems currently being developed.

Actual driving environments in which automotive radars may be deployed can vary greatly and many such driving environments may be complex. For example, actual driving environments may contain numerous objects, and some objects encountered in actual driving environments have complicated reflection and diffraction characteristics that affect echo signals. The immediate consequences of incorrectly sensing and/or interpreting echo signals may be that false warnings or improper reactions are triggered or warnings or reactions that should be triggered are not, which in turn can lead to accidents.

Consequently, auto manufacturers and the automotive radar manufacturers are eager to electronically emulate driving conditions to provide automotive radar systems with optimally accurate performance.

Single-target radar emulators are known. Emulating an actual driving scenario, however, necessitates emulating multiple targets. By way of example, there might be an automobile ahead of the radar-equipped vehicle in the same lane, a truck ahead and one lane to the left, a bicyclist ahead and hugging the right lane divider, another vehicle in cross traffic trying to run a red light. Emulating an apparent angle of arrival (AoA) using known devices is slow and unscalable to larger numbers due to the expensive electronics. Moreover, in most known emulators, only an incomplete subset of range, velocity, and AoA is emulated.

What is needed, therefore, is a system for emulating multiple targets encountered by a radar system that overcomes at least the drawbacks of the known radar emulators described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
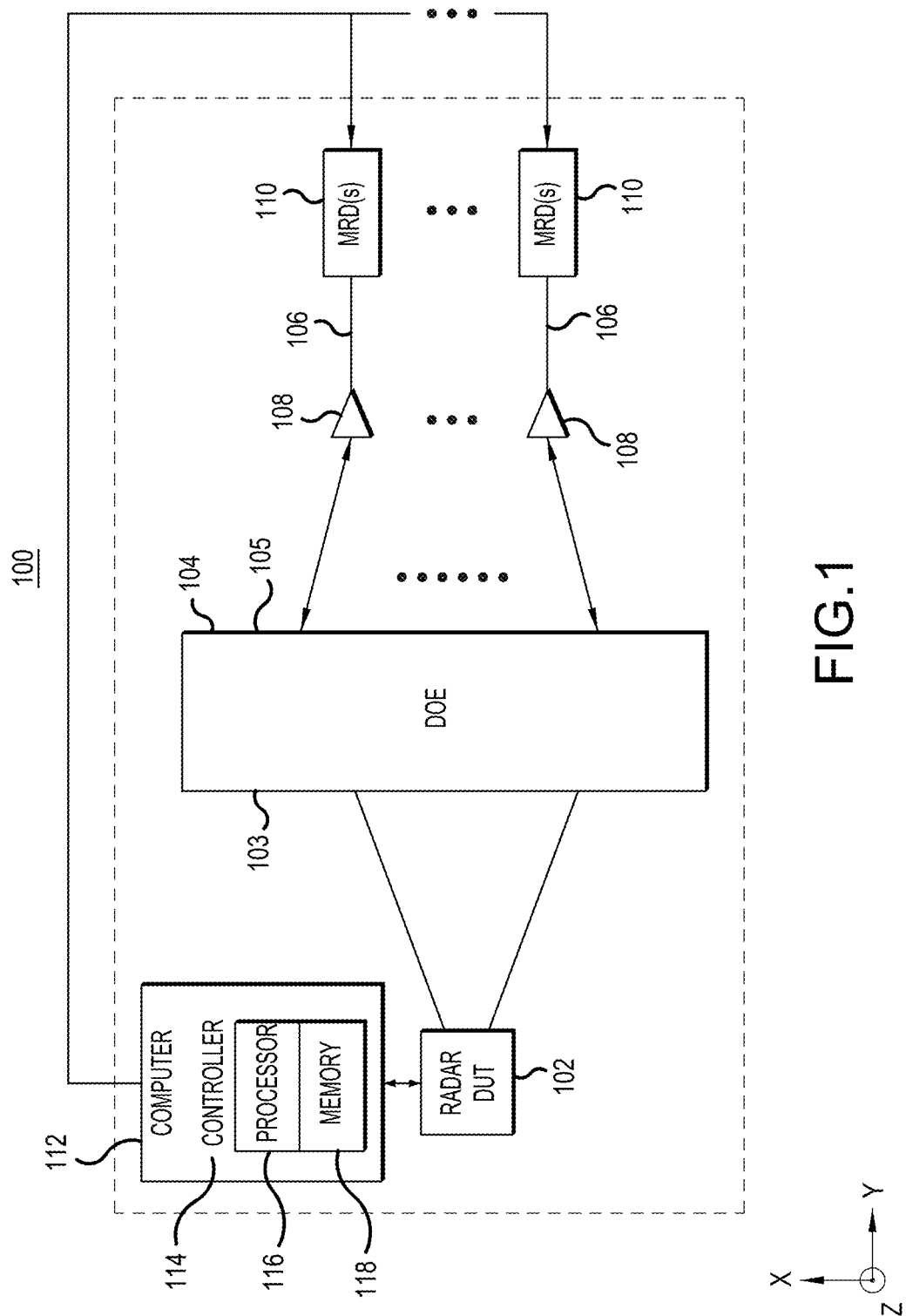
FIG. 1 is a simplified block diagram showing system for testing vehicular radar in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", or "coupled to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As described herein in connection with various representative embodiments, a system for testing vehicular radar is disclosed. The system comprises a diffractive optical element (DOE) configured to diffract electromagnetic waves incident on a first side from a device under test (DUT). The system also comprises a re-illumination element adapted to receive the electromagnetic waves diffracted from the DOE from a second side. The re-illumination element being adapted to transmit apparent angle of arrival (AoA) electromagnetic waves back to the DOE. The system also comprises a controller that includes a memory that stores instructions, and a processor that executes the instructions. The controller controls the re-illumination element, and is configured to perform performance testing on the vehicular radar that includes a plurality of targets.

FIG. 1 is a simplified block diagram showing system 100 for testing vehicular radar in accordance with a representative embodiment. As will be appreciated by one of ordinary skill in the art having the benefit of the present disclosure, one likely vehicular radar is an automobile radar that is used in various capacities in current and emerging automobile applications. However, it is emphasized that the presently described system 100 for testing vehicular radar is not limited to automobile radar systems, and can be applied to other types of vehicles including busses, motorcycles, motorized bicycles (e.g., scooters), and other vehicles that could employ a vehicular radar system.

In accordance with a representative embodiment, the system 100 is arranged to test a radar device under test (DUT) 102, and comprises a diffractive optical element 104, and a plurality of re-illuminators 106. Each of the re-illuminators 106 comprises an antenna 108 and an MRD 110. As described more fully herein, there is one re-illuminator for each emulated target.

The system also comprises a computer 112. The computer 112 illustrative comprises a controller 114 described herein. The controller 114 described herein may include a combination of a memory 116 that stores instructions and a processor 118 that executes the instructions in order to implement processes described herein. The controller 114 may be housed within or linked to a workstation such as the computer 112 or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller(s), slot(s) and port(s).

Additionally, although the computer 112 shows components networked together, two such components may be integrated into a single system. For example, the computer 112 may be integrated with a display (not shown) and/or with the system 100. That is, in some embodiments, functionality attributed to the computer 112 may be implemented by (e.g., performed by) the system 100 that includes the first medical imaging system 410. On the other hand, the networked components of the computer 112 may also be spatially distributed such as by being distributed in different rooms or different buildings, in which case the networked components may be connected via data connections. In still another embodiment, one or more of the components of the computer 112 is not connected to the other components via a data connection, and instead is provided with input or output manually such as by a memory stick or other form of memory. In yet another embodiment, functionality described herein may be performed based on functionality of the elements of the computer 112 but outside the system 100.

While the various components of the system 100 are described in greater detail in connection with representative embodiments below, a brief description of the function of the system 100 is presented currently.

In operation, the radar DUT 102 emits signals (illustratively mm wave signals) that are incident on a first side 103 of the DOE 104. As described more fully herein, the signals from the radar DUT 102 are diffracted by the DOE 104 and are focused at a respective one of the antennae 108, which as described more fully below, are beneficially a comparatively high-gain antennae. As such, the DOE 104 diffracts the incident wave at a particular angle relative to the second side 105, and each diffracted waved is focused on a respective one of the antennae 108. Notably, the respective focal points (alternatively foci) at each one of the antennae 18 represents a target that is emulated by the system 100.

Again, each of the signals diffracted by the DOE 104 is incident on a respective one of the antenna 108 of the re-illuminators 106. The signals incident on the antennae 108 are provided to a respective one of the MRDs 110. As described more fully herein, based on input from the controller, frequency modulation of the incident signals is effected in each of the MRDs and beneficially emulates a distance of a target from the radar DUT 102, or a velocity of a target relative to the radar DUT 102, or both. Moreover, and again as described more fully herein, the azimuth (±x-direction in the coordinate system of FIG. 1) and the elevation (±z direction in the coordinate system of FIG. 1) are emulated by the antennae 108, which are illustratively mechanically gimballed, or a combination of mechanical gimballing and electronic emulation.

The re-illuminated signals are incident on the second side 105 of the DOE 104, and are diffracted again, and incident on the radar DUT 102. The computer 112 receives the signals from the radar DUT 102 for further analysis of the accuracy of the radar DUT 102.

Figure 2:
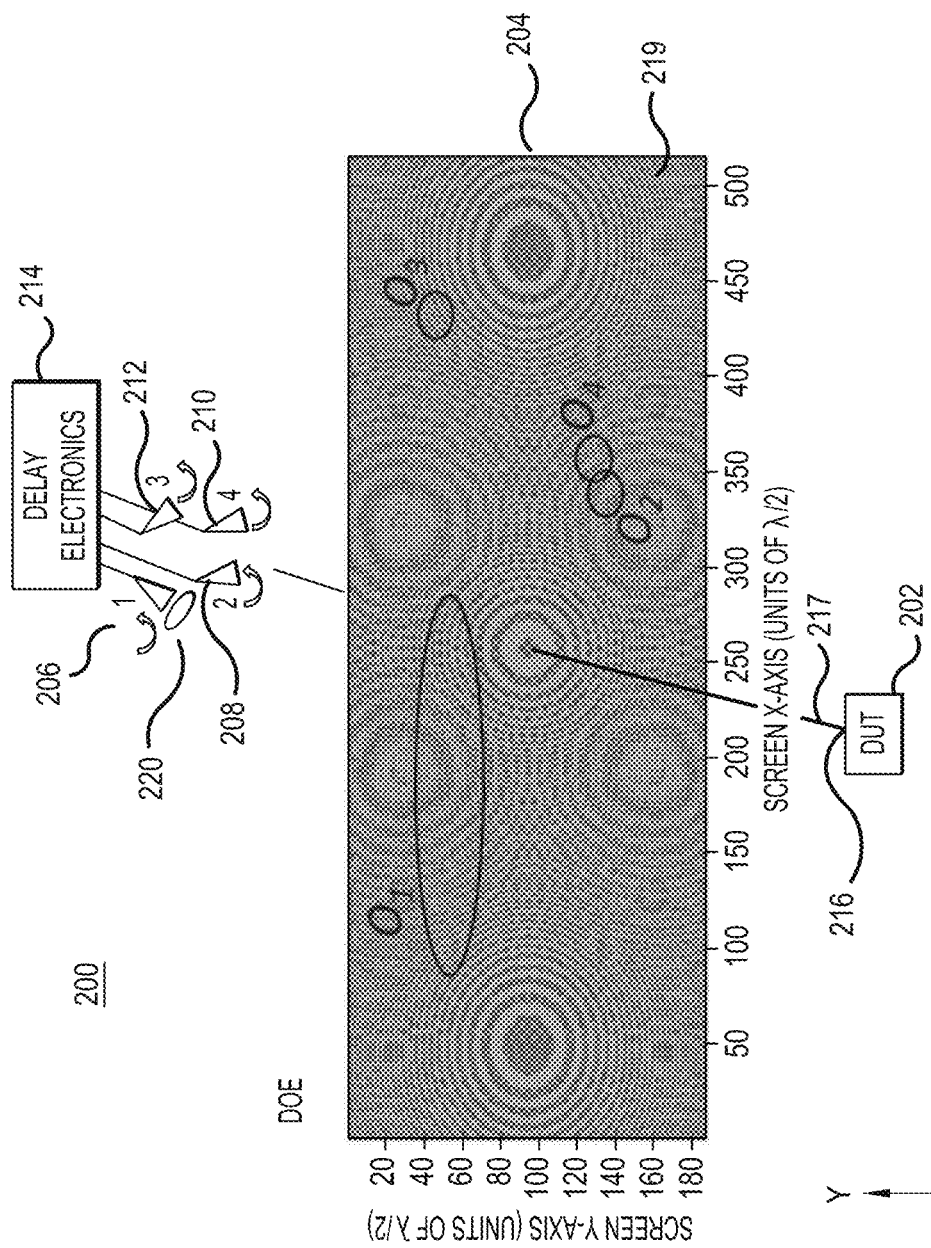
FIG. 2 is a simplified diagram of certain components of a system for testing vehicular radar in accordance with a representative embodiment.

FIG. 2 is a simplified diagram of certain components of a system 200 for testing vehicular radar in accordance with a representative embodiment. Aspects of system 100 described in connection with the representative embodiments of FIG. 1 may be common to the system 200 presently described, and although they may not be repeated.

The system 200 is configured to test a radar DUT 202, and comprises a DOE 204, a first re-illumination antenna 206, a second re-illumination antenna 208, a third re-illumination antenna 210, and a fourth re-illumination antenna 212.

Each of the first~fourth re-illumination antennae 206~212 are connected to delay electronics 214, which include at least one MRD (not shown in FIG. 2), and are described more fully below.

As also described below in connection with FIG. 3, the DOE 204 is a generalization of a Fresnel lens with diffraction elements having dimensions selected to diffract electromagnetic radiation of a desired frequency range. As noted above, the radar signals of the radar DUTs of the present teachings are in the millimeter-wave range.

The DOE 204 has a single focal point 216 (alternatively single 'focus') on a DOE axis 217 on a side 219 and at the radar DUT 202; and a plurality of focal points (alternatively plurality of foci, or foci) on a side opposing side 217, which faces the first~fourth re-illumination antennae 206~212. Each focal point of the plurality of foci are located at an input of one of the first~fourth re-illumination antennae 206~212. Generally, the number of the plurality of foci on the side opposing side 219 is chosen to be the maximum number of possible targets. In certain representative embodiments, the DOE 204 focuses signals from the radar DUT at 10 or more of locations. Signal emulation of the radar DUT 202 requires placement of a suitable reception device (e.g., a horn selected for the frequency of the radar DUT signals being receiver and re-illuminated) at locations where the signals from the DOE 204 focus. Notably, the number of emulated targets is controlled by the selection of the number of re-illumination antennae, or the number of active re-illumination antennae. As such, while radar signals transmitted from the single focus 216 at the radar DUT 202 are diffracted to the multiple foci on the side opposing side 219, target emulation may not be done for each diffracted signal.

In accordance with a representative embodiment, each of the first~fourth re-illumination antennae 206~212 are comparatively high gain antenna, having a gain of at least approximately 20 dBi. Notably, the first~fourth re-illumination antennae 206~212 are not dipole horns or low gain horns, because such devices can re-illuminate too much (if not all) of the DOE 204, causing errors in the AoA of the emulated targets. Rather, in certain representative embodiments, the first~fourth re-illumination antennae 206~212 are contemplated to be spot-focusing antennae. By way of illustration, the focal length of a spot-focusing antenna is between approximately 30% and approximately 100% of the distance between the focal point at the particular spot-focusing antenna and the DOE 204. The spot size illustratively has a diameter in the range of approximately 1 cm and approximately 6 cm.

In operation, radar signals are incident on the DOE 204 from the single focal point 216 of the radar DUT 202, and are diffracted by the DOE 204. The single radar signal transmitted from the radar DUT 202 is incident on the side 219, and emerges after diffraction as a plurality of radar signals from the side of the DOE 204 opposing side 219. Each of these emerging plurality of radar signals are diffracted by the DOE 204, and are focused at one of the first~fourth re-illumination antennae 206~212 The radar signals incident on the first~fourth re-illumination antennae 206~212 are input to the delay electronics, which emulate the target distances and relative velocities between the target and the radar DUT 202.

In certain representative embodiments, the azimuth (position relative to the DOE axis 217 along the x-direction of the coordinate system of FIG. 2) and elevation (position relative to the DOE axis 217 along the y-direction of the coordinate system of FIG. 2) of the emulated signal from each of the targets is emulated by mechanically gimballing (shown as arrows) the first~fourth re-illumination antennae 206~212. In other representative embodiments described herein, one of the azimuth or elevation orientations (i.e., angular orientations) of re-illuminated radar signals from the first~fourth re-illumination antennae 206~212 to the side of the DOE 204 opposing side 219 is effected electronically using components of the delay electronics disclosed herein. Accordingly, in certain representative embodiments a combination of mechanical gimballing of the first~fourth re-illumination antennae 206~212 and electronic beam-shaping are used to determine the subarea of the side of the DOE opposing side 219, and ultimately the emulated position and orientation of a target. Stated somewhat differently, in accordance with certain representative embodiments, emulation of both AoA degrees of freedom (azimuth and elevation) may be carried out in a fully mechanical manner without electronic control; or mechanical for one AoA degree of freedom (e.g., apparent elevation) and electronic for the other AoA degree of freedom (e.g., apparent azimuth).

In accordance with certain representative embodiments, first~fourth re-illumination antennae 206~212 are comparatively high-gain antennae, and, as noted above, can be so-called spot-focusing antennae such as lens horns. As such, the first~fourth re-illumination antennae 206~212 of the depicted embodiment receive radar signals diffracted to the multiple foci at respective positions of the inputs to the first~fourth re-illumination antennae 206~212, and re-illuminate four (again, more or fewer depending on the desired number of targets) rather small subareas of the DOE 204. The re-illuminated millimeter-wave DOE 204 presents apparent azimuth and elevation angles of the subarea spots to the normal to the radar DUT 202, and thus provides emulated AoA's of the emulated targets. These re-illuminated radar signals are then received by the radar DUT 202, and the accuracy of the radar DUT 202 is determined using a computer (e.g., computer 112).

As shown in FIG. 2, there are four areas $O_1$, $O_2$, $O_3$ and $O_4$ where the radar signals from the first~fourth re-illumination antennae 206~212 are incident on the DOE 204. Each of these four areas is focused on the single focal point 216 at the radar DUT 202. These four areas are emulated AoA target sub-areas, and represent the AoA of the four (in this case) emulated targets. Notably, an optional beam-expanding lens 220 can be provided, and causes a comparatively wide azimuth presented by the first target at $O_1$ on the side 219 of the DOE 204.

The four (in this illustration) areas $O_1$, $O_2$, $O3$ and $O_4$ are target spots that are illuminated by the illustratively gimballed first~fourth re-illumination antennae 206~212, which may be spot-focusing antennae. The DOE 204 can be considered as somewhat "angle-agnostic" facing the radar DUT 202, but the entire DOE (including areas not being spotted by the first~fourth re-illumination antennae 206~212 at a given moment in time) is designed to split its focusing to the various first~fourth re-illumination antennae 206~212. At another instant in time, one or more of the first~fourth re-illumination antennae 206~212 may be gimballed to a different spot on the DOE 204, so that other areas (e.g., $O_5$ (not shown) will be the new apparent angular target. As such, the reorientation of the first~fourth re-illumination antennae 206~212 (again, in this illustration) presents 'new' apparent targets for emulation of the system 200.

As will be appreciated, the emulation of the azimuth and elevation of targets are effected using the diffractive properties of the DOE 204, the orientation of the first~fourth re-illumination antennae 206~212, and in some instances beam-shaping lenses selected for the particular wavelength (e.g., millimeter) of the signals from radar DUT 202. By the present teachings, the emulation of the distance between the radar DUT 202 and a target, or the relative velocity of the radar DUT 202 and a target, or both, is done electronically using an MRD.

Figure 3:
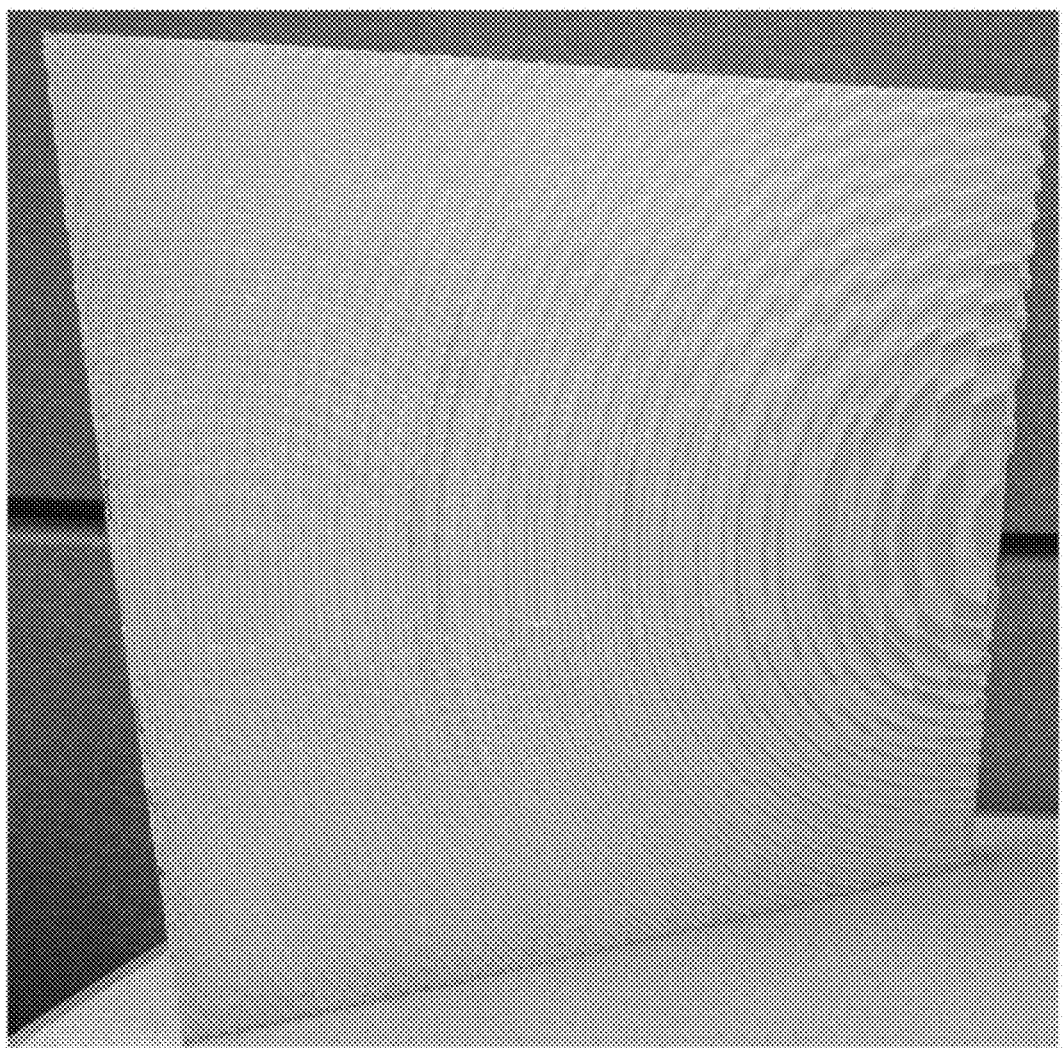
FIG. 3 is a perspective view of a diffractive optical element (DOE) in accordance with a representative embodiment.

FIG. 3 is a perspective view of a DOE tile 300 in accordance with a representative embodiment.

Like DOE 204, DOE tile 300 is a generalization of a Fresnel lens with diffraction elements having dimensions selected to diffract electromagnetic radiation of a desired frequency range. As noted above, the radar signals of the radar DUTs of the present teachings are in the millimeter-wave range.

DOE tile 300 is transparent to the wavelength of the radar DUT (e.g., millimeter-wave) is made of a suitable material for such transparency. Illustratively, the DOE tile 300 may be made of a suitable polymer, such as polystyrene, acrylic, polycarbonate, Ultem, or rexolite that has been processed to include the terracing as depicted in FIG. 3. Moreover, as shown in FIG. 3, the DOE tile 300 has terracing formed thereon to provide the diffraction of electromagnetic radiation incident thereon. The terracing has suitable selected dimensions to provide a piece-wise linear approximation to a smooth curved lens. In illustrative embodiments where the DOE tile 300 is made of a plastic or similar material, terracing is providing by processing a substrate of the selected material to have the desired contours of the terracing. In accordance with a representative embodiment, a plurality of DOE tiles 300 can be used to provide a DOE (e.g., DOE 204). For example, one (1) to eight (8) DOE tiles 300 may be used to provide a DOE.

As described above, the DOE tile 300 has a first side disposed nearest the radar DUT that provides a single focal point, and a second side, opposing the first side, and disposed nearest the re-illumination antennae that provides a plurality of foci. The number of foci is selected to provide the maximum number of targets to be emulated. However, as noted above, not all targets need to be emulated, so the number of targets being emulated in a particular test is based on the number of active re-illumination antennae.

As alluded to above, the apparent or emulated distance from the radar DUT 202 is determined by providing a delay in the signal received by the respective first~fourth re-illumination antennae 206~212. If the first~fourth re-illumination antennae 206~212 are connected to a reflecting open or short, then the apparent target distance will be the ray-trace distance (plus small corrections due to lens retardation, antenna retardation, etc.). As such, the apparent target distance is merely the sum of the DUT-subarea distance plus the subarea to re-illuminator distance. Moreover, in such a scenario there would be no relative velocity between the radar DUT 202 and the target. So, in FIG. 2, apparent or emulated distance between the radar DUT 202 and target 2 is merely the ray-trace distance from radar DUT 202 to subarea $O_2$ plus the distance from $O_2$ to the second re-illumination antenna 208. However, most driving emulation testing requires emulation distances of approximately 1 m to on the order of 100 m. Moreover, the direction of the target is determined by the system 200, and when combined with the emulated relative speed between the radar DUT 202 and the target being emulated, provides emulation of relative velocity of the target being emulated.

As noted above, the emulation of distance and speed is carried out by connecting each of the first~fourth re-illumination antennae 206~212 an MRD, a representative embodiment is now described in connection with FIG. 4.

Figure 4:
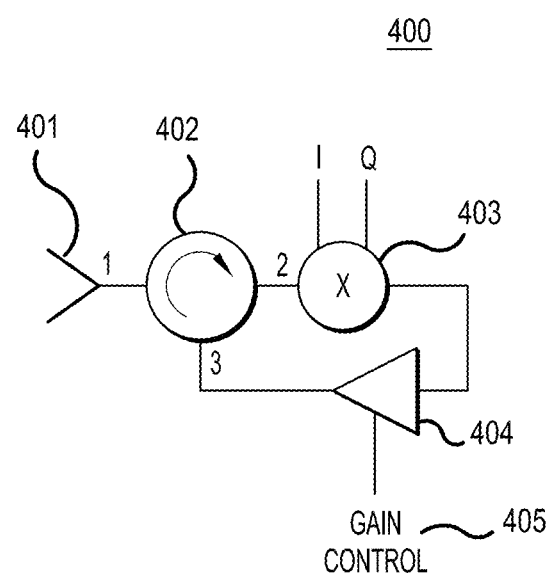
FIG. 4 is a simplified circuit diagram of a modulated reflection device (MRD) in accordance with a representative embodiment.

FIG. 4 is a simplified circuit diagram of a modulated reflection device (MRD) 400 in accordance with a representative embodiment. Aspects of the MRD 400 described in connection with the representative embodiments of FIG. 4 may be common to the MRD's and delay electronics described above, although they may not be repeated.

The MRD 400 is connected to a re-illumination antenna 401, and thus may be one of the re-illumination antennae described above. Of course, in practice, there is more than one MRD 400 in a system, and thus more than one re-illumination antenna 401 (e.g., as depicted in the representative embodiment of FIG. 2). In certain representative embodiments, the re-illumination antenna 401 is a horn selected for the wavelength of signals received from a radar DUT (not shown in FIG. 4). The re-illumination antenna 401 may have a variable gain, and may be coupled to a beam-shaping element, such as a lens to tailor a degree of freedom of an AoA, as noted above. The use of a horn or similar antenna for re-illumination antenna 401 is not essential, and other types of antennae, such as patch antennae or patch antennae arrays (described below), are contemplated.

The MRD 400 comprises a circulator 402 connected to a mixer 403. The mixer 403 is an in-phase (I)-quadrature (Q) mixer (IQ mixer), which for reasons described below, is beneficially a single-sideband IQ mixer, with standard 90° phasing of the RF signal, resulting in an output of either the upper sideband (USB) or the lower sideband (LSB), rejecting the LSB or USB, respectively. The output of the mixer 403 is provided to a variable gain amplifier (VGA) 404, which comprises a gain control input 405. As alluded to above, the gain control input 405 of the VGA 404 is connected to a computer (e.g., computer 112 of FIG. 1). Notably, the VGA 404 enables proper emulation of the re-illuminated signal received from the DOE at the re-illumination antenna 401. Specifically, as noted above, the incident signal from the radar DUT on the DOE is split among the number of foci at the re-illumination antennae 401. As such, upon diffraction by the DOE, the power of the signal is split, and therefore the power of each radar signal diffracted to the multiple foci at the re-illumination antennae 401 is reduced compared to the output power of the radar signal from the radar DUT. Moreover, as noted above, the portion (and thus the power) of the signal diffracted from foci on the side of the DOE facing the re-illumination antennae 401 depends on the orientation of the re-illumination antenna 401 relative to one or more foci at the re-illumination antennae 401. As such, the power of the signal incident on the re-illumination antennae 401 may be insufficient for re-transmission back to the radar DUT, and thus for accurate testing. Moreover, the power of the re-illuminated signal from the re-illumination antennae 401 is an indication of the emulated distance between a target and the radar DUT. As such, the gain provided by the VGA 404 is selected at the gain control input 405 based on the power of the radar signal incident on the re-illumination antennae 401, and the desired emulation distance of the target being emulated.

Notably, power is used to emulate consistent radar cross-section (RCS). The radar cross-section (RCS) can be stored in look-up in tables. To this end, for a given range r, it is known that the return signal is proportional to RCS and falls as $1/r^4$. A vehicle is typically quoted as being 10 dBsm, which is radar speak for measuring area, meaning 10 dB relative to a square meter (s.m.), or in plain English, 10 square meters. Many objects have been tabulated (people, bicyclists, buildings, etc.) and those which haven't can be calculated these days by ray tracing techniques. By the present teachings, emphasis is placed on providing a return signal strength to the radar DUT that is commensurate with the distance r (obeying the well-known $1/r^4$ radar decay law) and the accepted value of RCS for the particular object. In accordance with a representative embodiment, the signal strength (and thus power) is adjusted by adjusting the strength of the I/Q drive signals from the computer 112 to the MRDs of the various embodiments, with a weaker I/Q drive signal providing a comparatively weaker emulation signal. Notably, in certain representative embodiments, the computer 112 precomputes the consistent return signal provided to the single point of focus at the radar DUT, and the controller 114 then adjusts the strength of the I and Q drives to achieve this SSB strength. Alternatively, and beneficially, the gain of VGA 404 can be adjusted to control return SSB strength.

Because many vehicular radars are frequency-modulated continuous-wave (FMCW) devices, it is not necessary to implement a true variable delay line to emulate a variable apparent time delay. Rather, the distance/velocity is emulated electronically using the MRD 400. To this end, FMCW radar systems use chirped waveforms, whereby the correlation of the original transmit (Tx) waveform from the radar DUT with the received (Rx) echo waveform reveals the target distance. For example, in upchirp/downchirp systems with chirp rates of $\pm k_{SW}$ (measured in Hz/sec), a target at a distance d and zero relative velocity to the ego vehicle will result in a frequency shift ($\delta f$) given by:

$$\delta f = (\pm 2k_{SW} d/c) \quad \text{(Eqn. (1))}$$

where c is the speed of light and the factor of 2 is due to the roundtrip propagation of the signal from the radar DUT. The sign of the shift depends on which part of the waveform, upchirp vs. downchirp, is being processed. In contrast, Doppler shifts due to relative velocity manifest as "common mode" frequency shifts; e.g., a net upshift over both halves of the waveform indicates the radar DUT is approaching closer to the target. Correlation is performed in the DUT's IF/baseband processor; bandwidths of a few MHz are typical.

The most commonly deployed variation of FMCW uses repetitive upchirps, or repetitive downchirps, but not both (with intervening dead times). As such, the distance to a target is determined as in the previous paragraph, now without the sign issue. Relative velocity is determined by measuring the phase shift between successive frame IF correlation signals, where frame is a term of art for one period of the waveform. In many FMCW radar applications, the frame repetition rate is typically a few kHz.

One known approach introduced the concept of receiving a transmit signal from a radar DUT at one or more probe points, then applying balanced phase modulation to the received signal, before returning the signal back to the radar DUT. Because phase modulation is another form of frequency modulation, balanced phase modulation of such a known system results in a double sideband (DSB) modulation of the original signal, suppressing the original swept carrier. Balanced phase modulation is rather easy to implement because one can simply switch between an open and a short load. If the modulation frequency is $\delta f^*$, and the original signal's time-dependent frequency is f(t), then due to comparatively slow chirp rates, the time-dependent frequency of the return signal is $f(t) \pm \delta f^*$. From Eqn. (1), by choosing $$\delta f^* = 2k_{SW}(d_{em} - d_{su})/c \quad \text{(Eqn. (2))}$$

the referenced known method emulates a target distance of $d_{em}$ for a setup distance of $d_{su}$, which is the physical distance between the radar DUT and the probe. Unfortunately, due their DSB modulation, for every intentionally created target j at distance $d_{em,j}$ this method also creates a twin ghost target at distance $d_{em,j} \pm 2d_{su,j}$, where $d_{su,j}$ is the setup distance to probe j, where the sign in the "ghosting equation" depends on the sign of the chirp slope.

For long range radars (LRR's), a distance accuracy of 10 cm is desired, whereas short range radars (SRR's) strive for 2 cm accuracy. This implies that the setup distances of the known DSB modulation test set-ups must be <5 cm for LRR's and <1 cm for SRR's for the ghost twinning not to matter. Achieving such set ups is exceedingly difficult since the setup distance includes the actual radar patch antenna-to-bumper distance, the bumper-to-probe distance, and the effective bumper thickness=actual bumper thickness multiplied by the millimeter-wave refractive index of the bumper material.

Another shortcoming of the known DSB modulation test set-up is the inability to emulate variable AoA's. In such a known system, the apparent AoA's are fixed. In principle, the AoA's could be varied by mounting the probes on translation stages but then one encounters the blocking problem mentioned in the Introduction. Of course, this is not very efficient.

A third shortcoming of the referenced known system is that the dynamic range of radar cross section (RCS), i.e., the strength of the echo, was limited to less than 20 dB. This is because there was no matched load state for switches used in the known system, simply a crossover point between "open" and "short" which acted as a quasi-match when the modulation was shut off and the switch was biased at this point. Substituting in a tristate switch is not an adequate solution to increasing dynamic range because the RCS must be varied almost continuously. Automotive radar RCS needs to be varied over 25-50 dB, depending on various estimates.

Referring again to FIG. 4, upon amplification/attenuation at the circulator 402, MRD provides an amplified/attenuated SSB signal that is returned to the circulator 402 and retransmitted out the re-illumination antenna 401.

Figure 5A:
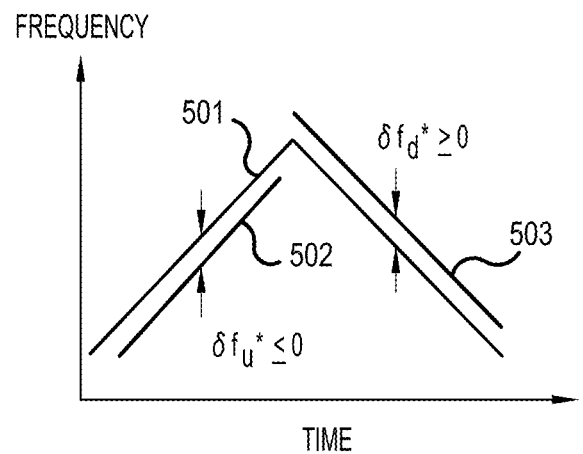
FIG. 5A is a graph of the frequency versus time of a chirped signal in accordance with a representative embodiment.

Notably, in the SSB MRD 400 of the representative embodiment, decreasing the strength of the modulation I and Q drive signals will decrease the output tone strength and thus decrease the RCS. In practice, this method likely won't achieve more than 15-20 dB of dynamic range by modulation drive alone. However, the VGA 404 makes up the deficit to achieve the desired RCS dynamic range, and 10-50 dB of variable gain can be readily achieved by a combination of variable attenuators and amplifier bias adjustment. Emulation of relative velocity of a target in systems for testing vehicular radar in accordance with representative embodiments requires synchronous operation between the modulation and the radar DUT frames. Such synchronous operation can be effected by providing a trigger signal from the radar DUT, or deriving such a trigger. The triggering is facilitated either by using an auxiliary detector (sometimes referred to as a "sniffer"), or by tapping the output of the circulator 402. For example, the auxiliary detector may be used to detect the arrival of a first chirp and a second chirp of each frame of the radar DUT. In an example where the frame rate is about 10 fps (frames per second), recording the time interval between just two chirps in a burst or frame, allows through Eqn. 3 below, to determine a consistent chirp repetition rate for the emulation. For upchirp/downchirp radar DUTS, the synchronization governing the switching from LSB to USB as shown in FIG. 5A. For all-upchirp radars, the synchronization allows the zero of phase to be tied to the frame starts. Therefore, in accordance with a representative embodiment, a phase slip in the modulation signal is introduced between frames that exactly mimics the phase slip such a radar DUT would encounter in the presence of relative velocity, as discussed below in connection with FIG. 5B.

Referring to FIG. 5A a graph of frequency versus time depicts an upchirp/downchirp in accordance with a representative embodiment. Curve 501 represents is the Tx chirp signal from the radar DUT, and curves 502, 503 represented the re-illumination signal from the MRD (e.g., MRD 400). During upchirp(downchirp), a LSB(USB) signal is selected. Notably, the gap between curve 501 and curves 502, 503 are exaggerated for clarity of description; in reality the gap is comparatively very small since $\delta f_u^*$ and $\delta f_d^*$ are at most a few MHz, whereas the chirp span is 1-4 GHz, typically. Thus, for correlation purposes, the gap is negligible. Hence, curves 502, 503 look like a delayed version of the curve 501, with the delay corresponding to the emulated distance between the radar DUT and the particular target Relative velocity is given by the usual Doppler formula applied to the algebraic average of the nonpositive $\delta f_u^*$ and the nonnegative $\delta f_d^*$.

Figure 5B:
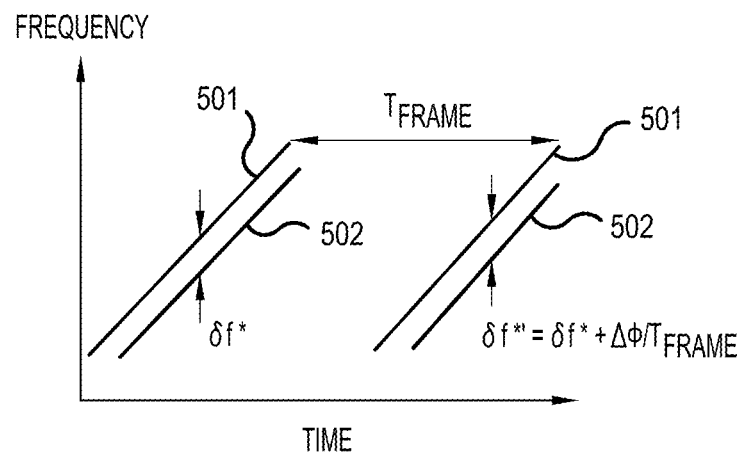
FIG. 5B is a graph of the frequency versus time of a chirped signal in accordance with a representative embodiment.

Referring to FIG. 5B, a graph of frequency versus time depicts an upchirp/downchirp in accordance with a representative embodiment. $\Delta\phi$ is the successive frame phase slip intentionally introduced into the modulation signal of the MRD. When received by the DUT Rx, the upchirp/upchirp FMCW DUT processes the frames, detects this phase slip, and perceives relative velocity. Again, the inferred delay between curves 501 and 502 is interpreted as target distance by the radar DUT.

Notably, there is both coarse velocity and fine velocity. Coarse velocity is just change in distance between frames divided by frame time, typically on the order of 0.1 second. Fine velocity (sometimes called Doppler) is calculated by measuring the IF phase slip $\Delta\phi$ between successive chirps. If T is the chirp-to-chirp period and $\lambda$ is the midband wavelength then $$v_{fine} = \lambda \Delta\phi / (4\pi T) \quad \text{(Eqn. (3))}$$

Coarse velocity typically covers roughly +−5 mph to >+−100 mph. Fine velocity is a Vernier that can extend resolution/accuracy to ~+−0.1 mph. Fine velocity typically runs into aliasing at ~5-7 mph, but that's were coarse velocity takes over to disambiguate the aliasing. Notably, coarse and fine velocity can be combined to obtain continuous velocity measurement from fractions to hundreds of miles per hour with accuracy and resolution below 1 mph.

In the representative embodiments described to this point, the delay and thus distance and velocity of a target is emulated electronically, whereas the degrees of freedom of AoA, azimuth and elevation, of a target are emulated mechanically (e.g., by gimballing). The presently described representative embodiment allows for the electronic emulation of azimuth, as well as distance and velocity. Notably, while the presently described representative embodiment is described in connection with only electronic azimuth emulation of a target, it is noted that in the alternative, the elevation may also be emulated.

Figure 6A:
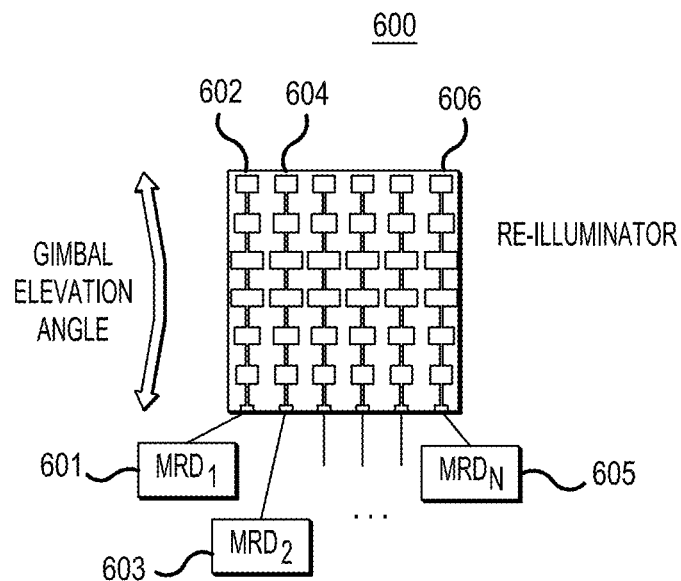
FIG. 6A is a simplified schematic diagram of a re-illuminator in accordance with a representative embodiment.

FIG. 6A is a simplified schematic diagram of a re-illuminator 600 in accordance with a representative embodiment. Aspects of the re-illuminator 600 described in connection with the representative embodiments of FIG. 6A may be common to the re-illuminators and systems described above, although they may not be repeated.

At the outset, it is noted that re-illuminator 600 may be used for one of the first~fourth re-illumination antennae 206-210, which may be connected to a respective one MRD 400. As such, a plurality of targets (not shown in FIG. 6A) being emulated would require a plurality of (active) re-illuminators 600, with each active re-illuminator 600 being implemented to emulate distance/velocity and AoA's of each target being emulated.

The re-illuminator 600 comprises a first MRD 601, which is connected to a first patch antenna array 602; a second MRD 603, which is connected to a second patch antenna array 604, etc.; with an $n^{th}$ MRD 605, which is connected to an $n^{th}$ patch antenna array. As described herein, a phase delay is introduced from successive MRD's and emulates the azimuth of a single target (not shown in FIG. 6A).

In accordance with representative embodiments, the first, second and $n^{th}$ patch antenna arrays 602, 604, 606, are so-called microstripe antennae arrays. Each of the first, second and $n^{th}$ patch antenna arrays 602, 604, 606 comprises a plurality of patch antennae connected in series such as by a suitable signal transmission line, and thus are substantially in-phase with each other.

To provide azimuthal emulation of a target, the electrical phase between each adjacent patch antenna array is varied to scan in the azimuth direction. Specifically, as shown, each of the first, second and $n^{th}$ patch antenna arrays 602, 604, 606 is fed by a respective one of the first, second, . . . $n^{th}$ MRDs 601, 603, 605, where the phase of the output of each next MRD is delayed compared to the last. Specifically, the phase and frequency of the chirped input signals to the respective first, second . . . nth MRDs 601, 603, 605 results in a change in phase between each successive path antenna array that dictates the steering of distance and the Doppler velocity.

Notably, the MRDs of the present teachings do not require a local oscillator (LO) since the MRD is functioning as a transponder, rather than a transmitter or a receiver requiring LO modulation or demodulation. It is noted that while many known transponders work by receiving, downconverting, IF processing, upconverting, and retransmitting, this processing chain is by no means necessary.

Figure 6B:
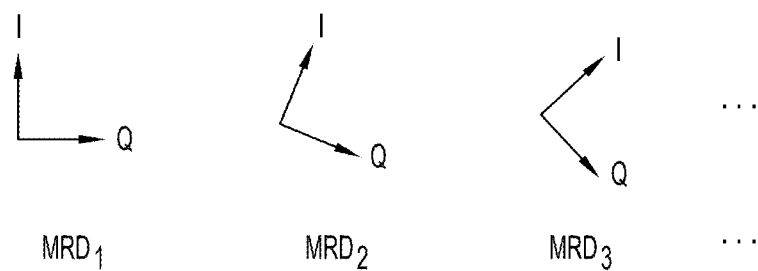
FIG. 6B shows phase relationships of in-phase and quadrature components of mixers of MRDs of FIG. 6A, in accordance with a representative embodiment.

Relative in-phase phasing and identical relative quadrature-phase phasing on the common modulation frequency $\delta f^*$ is applied to first, second . . . $n^{th}$ MRDs 601, 603, 605 connected to the same re-illuminator. Notably, "relative" phasing can be understood in the representative embodiment of FIG. 6A as the $\delta f^*$ phases on the I(Q) channels of the successive MRD's connected to the re-illuminator. As shown in FIG. 6B, each MRD I-Q coordinate system as rotated compared to the previous neighbor MRD. Again, it is noted that $\delta f^*$ is only a few MHz typically, so the many phase impositions can be implemented with both low loss and low cost. The relative phasing imposed on both I and Q modulation channels results in relative phasing of the SSB chirped return signals across the n patch antenna arrays, thus implementing azimuthal steering by the well-known RF phased array principle.

Referring again to FIGS. 6A and 6B, the first patch antenna array 602 can be considered the reference array. The output of the second patch antenna array 604 is rotated upon retransmit, and thus $I_2$ of the second patch antenna array 604 is shifted relative to $I_1$ of the first patch antenna array 602. This phase progression continues with successive phased antenna arrays, with electronic azimuthal delay being imparted on the signal at the half-way point between the radar DUT and the re-illumination device for the particular target being emulated. Upon re-transmission from the re-illuminator 600, the signal is offset, and appears to be from a different point (azimuthally) of the DOE of the system. As such, the re-illuminator 600 allows for emulation of a (single) target in the azimuthal direction. Similarly, for each target being emulated in azimuth, one re-illuminator 600 can be implemented for one re-illumination antenna/MRD described in connection with the systems and components of the representative embodiments of FIGS. 2-4.

As will be appreciated, specular reflection from a DOE of one or more of the systems described above can result in an ever-present echo signal from the DOE at the radar DUT. The present teachings contemplate a passive technique to substantially remove this echo signal, and an active way to substantially remove this echo signal.

Figure 7:
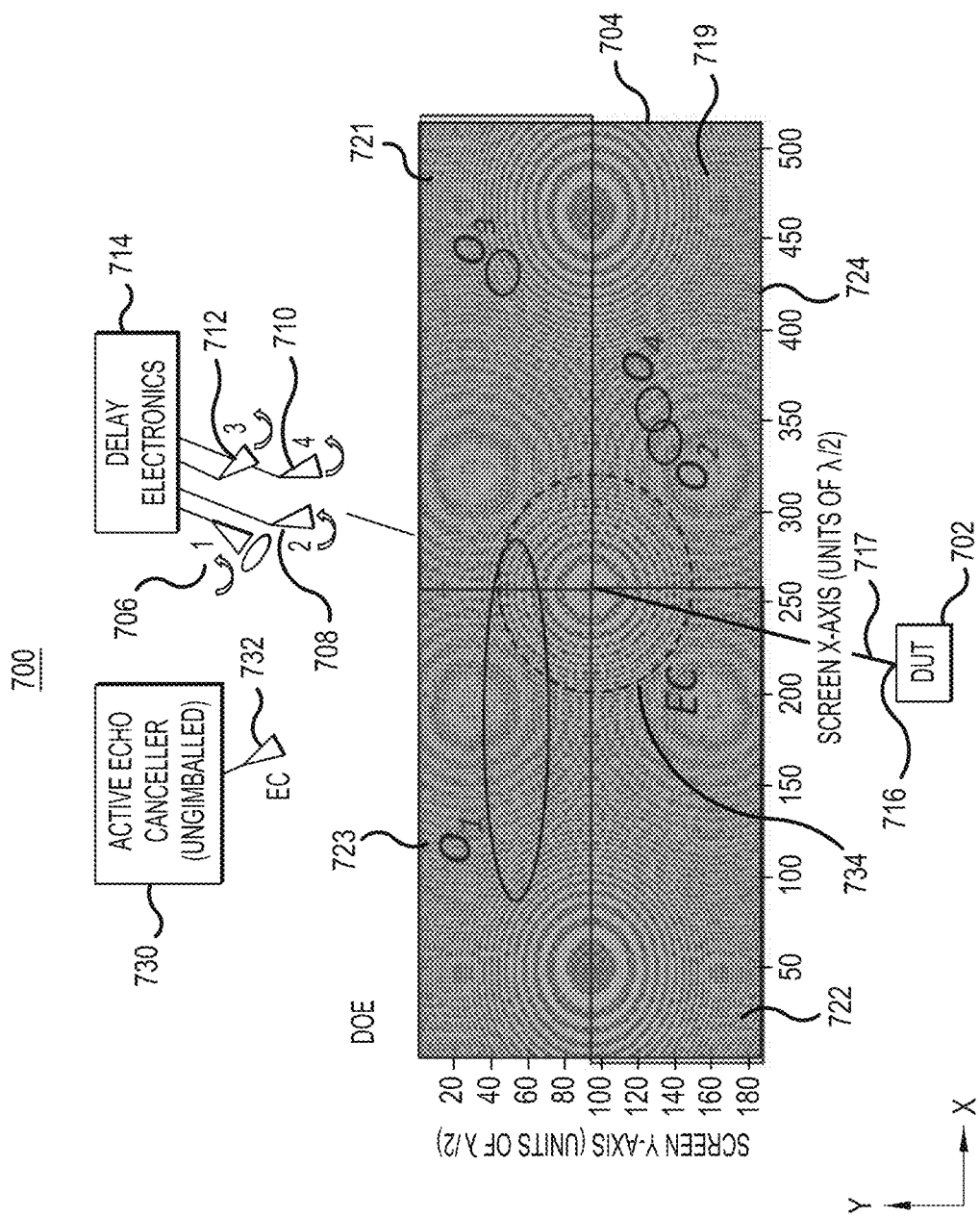
FIG. 7 is a simplified diagram of certain components of a system for testing vehicular radar including active echo cancellation in accordance with a representative embodiment.

FIG. 7 is a simplified diagram of certain components of a system 700 for testing vehicular radar including active echo cancellation in accordance with a representative embodiment. Aspects of system 700 described in connection with the representative embodiments of FIGS. 1-6B may be common to the system 700 presently described, and although they may not be repeated.

The system 700 is configured to test a radar DUT 702, and comprises a DOE 704, a first re-illumination antenna 706, a second re-illumination antenna 708, a third re-illumination antenna 710, and a fourth re-illumination antenna 712. Each of the first~fourth re-illumination antennae 706712 are connected to delay electronics 714, which include at least one MRD (not shown in FIG. 2), and are described more fully below.

As also described below in connection with FIG. 3, the DOE 704 is a generalization of a Fresnel lens with diffraction elements having dimensions selected to diffract electromagnetic radiation of a desired frequency range. As noted above, the radar signals of the radar DUTs of the present teachings are in the millimeter-wave range.

The DOE 704 has a single focus 716 at the location of the radar DUT 702 on a DOE axis 717, and a plurality of foci on a side opposing side 719, where one of the plurality of foci is located at a respective one of the first~fourth re-illumination antennae 706~712. Generally, the number of foci on the side opposing side 719 is chosen to be the maximum number of possible targets. As noted above, the present teachings contemplate 10's of targets, thus requiring focusing of signals diffracted by the DOE 704 at points located at the input of each re-illumination antenna (in this case at each of the first~fourth re-illumination antennae 706~712). Notably, the number of emulated targets is controlled by the selection of the number of re-illumination antennae, or the number of active re-illumination antenna. As such, while radar signals transmitted from the single focus at the radar DUT 702 are diffracted and are incident on multiple foci at each of the respective first~fourth re-illumination antennae 706~712, target emulation may not be done for each diffracted signal.

In operation, radar signals from the radar DUT 702 are transmitted to the DOE 704 at the single focus 716 located at the radar DUT 702, and are diffracted and map to the plurality of foci at the first~fourth re-illumination antennae 706~712 located on the side of the DOE opposing side 719. The radar signals are further transmitted to the plurality of foci located at each of the first~fourth re-illumination antennae 706~712. The radar signals incident on the first~fourth re-illumination antennae 706~712 are input to the delay electronics, which emulate the target distances and relative velocities between the target and the radar DUT 702.

One aspect of echo cancellation is effected using a low-dielectric constant lens material applied to side 719. Even though this reduces the index retardation relative to air, the wavelengths from the radar DUT 702 are short enough that terracing steps of a few mm become the norm, so the overall lens thickness is quite reasonable. According to another aspect of echo cancellation, in a representative embodiment, in which the cancellation of the echo from the DOE 704 is passively effected, a symmetric pattern is provided that is multi-fold.

In the presently described embodiment, the DOE 704 then has fourfold symmetry, i.e., the left and right halves of the DOE 704 are mirror images of each other; and the top and bottom halves of the DOE 704 are mirror images of each other. A lens axis from the center of the radar DUT 702 through the symmetry center of the re-illumination antennas.

Generally, it becomes complicated to achieve symmetry of the DOE 704 that is greater than 4-fold. However, multiples of 4-fold symmetry are comparatively easy to establish. So, and again for purposes of illustration, and not limitation, the maximum number of targets can be selected to multiples of 4 to preserved the symmetry, although not all targets must be simultaneously emulated as noted herein. So, for example, if it is desired to emulate 10 targets, the DOE 704 can be designed for emulation of 12 targets (thus preserving the 4-fold symmetry), with two of the re-illumination antennae associated VGA's shut off and thus not representing targets.

Since the focal depth of a lens is never less than a wavelength λ (at least not for any of the categories of lenses contemplated for the present teachings), the DOE 704 is divided into quadrants, and the quadrants are staggered. As is known in the art, staggering is physical displacing the DOE tiles in the z-direction of FIG. 7 along DOE axis 717 In a representative embodiment, the staggering is by either 0 or λ/4 in the axial direction without changing the focal properties. In the representative embodiment of FIG. 7, a first quadrant 721 and a second quadrant 722 are staggered and each effect a phase-shift of the reflected signal from the radar DUT 701 of λ/4, wherein λ is the wavelength of the reflected signal. The third quadrant 723 and the fourth quadrant, but contrast, are not staggered. As such a $2^{nd}$ order null in reflection on DOE axis 717 is achieved. Again, the first and second quadrants 721,722 are axially staggered by λ/4. This creates an extra λ/2 phase shift in the radar signals reflected from first and second quadrants 721,722 (with no change in transmission amplitude or phase), so the reflected sum of the 4 quadrants adds up to 0 back toward the radar DUT 202.

Active cancellation comes from the an active canceller 730 (or, alternative auxiliary re-illuminator) including an auxiliary re-illumination antenna 732. The active canceller 730 produces the black dashed central area 734 (labelled by "EC") in the center of the DOE 704. The auxiliary re-illumination antenna 732 is positioned at some convenient transmission sidelobe of the DOE 704, where "transmission" refers to the Tx power from the radar DUT 202 that is neither absorbed nor reflected by the DOE 204. A calibration is performed whereby no targets are emulated but the phase and gain of the active canceller 730 are adjusted to minimize the DUT's reception. Specifically, the computer 112 controls the cancellation signals but they emanate from another re-illumination antenna, such as auxiliary re-illumination antenna 732. The cancellation signals are incident at the center of the DOE 704 and are refocused to the radar DUT 702. This is very similar to noise cancelling headphones. A very convenient method to accomplish this is to connect an MRD to the auxiliary re-illumination antenna 732 and choose its $\delta f^*$ so that the canceller distance matches the distance between the radar DUT 202 and the DOE 204, and the auxiliary $\delta f^*$ phase and VGA gain produce destructive interference with the specular reflection.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Although various target emulations for automobile radar systems have been described with reference to several representative embodiments, it is understood that the words that have been used are words of description and illustration, rather than words of limitation. Changes may be made within the purview of the appended claims, as presently stated and as amended, without departing from the scope and spirit of dynamic echo signal emulation for automobile radar sensor configurations in its aspects. Although dynamic echo signal emulation for automobile radar sensor configurations has been described with reference to particular means, materials and embodiments, dynamic echo signal emulation for automobile radar sensor configurations is not intended to be limited to the particulars disclosed; rather dynamic echo signal emulation for automobile radar sensor configurations extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "teachings" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system for testing vehicular radar, comprising:
   a diffractive optical element (DOE) configured to diffract electromagnetic waves incident on a first side from a radar device under test (DUT); and
   a re-illumination element comprising a plurality of modulated reflection devices (MRDs), each comprising: an antenna; a circulator; an in-phase-quadrature (IQ) mixer; and a variable gain amplifier (VGA), wherein the re-illumination element is adapted to receive the electromagnetic waves diffracted from the DOE from a second side, the re-illumination element being adapted to transmit apparent angle of arrival (AoA) electromagnetic waves back to the DOE.

2. The system of claim 1, wherein the re-illumination element is adapted to emulate an apparent target distance, or an apparent target velocity, or both.

3. The system of claim 1, wherein a gain or loss of the VGA is selected to map a radar cross-section to a respective one of a plurality of targets.

4. The system of claim 1, wherein the plurality of MRDs is equal to a plurality of targets.

5. The system of claim 1, wherein each of the plurality of MRDs is connected to a respective one of a plurality of arrays of patch antennas connected adjacent to one another, and the plurality of MRDs and plurality of patch antennas comprise a single re-illumination element.

6. The system of claim 5, wherein the single re-illumination element is not gimballed in an azimuthal direction.

7. The system of claim 5, wherein in each of the respective one of the plurality of arrays of patch antennas comprises a plurality of patch antennas connected in series by a signal transmission line.

8. The system of claim 7, wherein a phase of the electromagnetic waves that travel along a respective one of the plurality of patch antennas connected in series are substantially in series.

9. The system of claim 7, wherein a phase of the electromagnetic waves that travel along adjacent arrays of the plurality of patch antennas have electrical phases that are varied to scan in an azimuthal direction.

10. The system of claim 1, wherein the DOE comprises a single focus on the first side at an input/output of the radar DUT, and a plurality of foci on the second side, each of the plurality of foci being disposed at one of the antennae.

11. The system of claim 10, wherein a number of the plurality of foci is equal to a number of a plurality of targets being emulated by the system.

12. The system of claim 10, wherein a number of the plurality of foci is greater than a number of a plurality of targets being emulated by the system.

13. The system of claim 1, wherein each antenna is a spot-focusing antenna.

14. The system of claim 1, wherein the DOE fosters reduction of the electromagnetic waves specularly reflected from its first side.

15. The system of claim 13, wherein the DOE is multifold symmetric and arranged to provide $\lambda/2$ phase shift of the electromagnetic waves reflected from the first side of the DOE, the $\lambda/2$ phase shifted electromagnetic waves substantially cancelling the electromagnetic waves specularly reflected from the first side.

16. The system of claim 1, further comprising:
a controller comprising a memory that stores instructions, and a processor that executes the instructions, wherein the controller controls the re-illumination element and is configured to perform performance testing on the vehicular radar that includes a plurality of targets.

17. A system for testing vehicular radar, comprising:
a diffractive optical element (DOE) configured to diffract electromagnetic waves incident on a first side from a radar device under test (DUT);
a re-illumination element adapted to receive the electromagnetic waves diffracted from the DOE from a second side, the re-illumination element being adapted to transmit apparent angle of arrival (AoA) electromagnetic waves back to the DOE, wherein the re-illumination element is adapted to emulate an apparent target distance, or an apparent target velocity, or both;
an active echo canceller comprising an auxiliary re-illumination antenna, the active echo canceller being connected to one of a plurality of modulated reflection devices (MRDs), wherein the active echo canceller has a frequency-shift ($\delta f^*$) and a variable gain amplifier (VGA) has a gain, the a frequency-shift ($\delta f^*$) and the gain of the VGA being selected to destructively interfere with electromagnetic radiation that is specularly reflected from the first side of the DOE; and
a controller comprising a memory that stores instructions, and a processor that executes the instructions, wherein the controller controls the re-illumination element and is configured to perform performance testing on the vehicular radar that includes a plurality of targets.

18. The system of claim 17, wherein the re-illumination element further comprises:
a plurality of modulated reflection devices (MRDs), each comprising: an antenna;
a circulator; an in-phase-quadrature (IQ) mixer; and a variable gain amplifier (VGA).

19. The system of claim 18, wherein a number of a plurality of foci is greater than or equal to a number of the plurality of targets being emulated by the system.

20. The system of claim 17, wherein each of the plurality of MRDs comprises: an antenna; a circulator; an in-phase-quadrature (IQ) mixer; and a variable gain amplifier (VGA) wherein the active echo canceller is not gimballed.

* * * * *